(12) United States Patent
Chen

(10) Patent No.: US 10,402,693 B2
(45) Date of Patent: Sep. 3, 2019

(54) APPARATUS AND METHOD FOR CLASSIFYING PATTERN IN IMAGE

(71) Applicant: CANON KABUSHIKI KAISHA, Tokyo (JP)

(72) Inventor: Tsewei Chen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 15/483,359

(22) Filed: Apr. 10, 2017

(65) Prior Publication Data

US 2017/0300787 A1 Oct. 19, 2017

(30) Foreign Application Priority Data

Apr. 15, 2016 (JP) ................................ 2016-082329

(51) Int. Cl.
| | | |
|---|---|---|
| *G06K 9/00* | (2006.01) | |
| *G06K 9/46* | (2006.01) | |
| *G06K 9/62* | (2006.01) | |

(52) U.S. Cl.
CPC ....... *G06K 9/6267* (2013.01); *G06K 9/00973* (2013.01); *G06K 9/4604* (2013.01); *G06K 9/629* (2013.01); *G06K 9/6257* (2013.01)

(58) Field of Classification Search
CPC ............ G06K 9/6267; G06K 9/00973; G06K 9/4604; G06K 9/6257; G06K 9/629
See application file for complete search history.

(56) References Cited

U.S. PATENT DOCUMENTS

| | | | | |
|---|---|---|---|---|
| 9,082,015 B2* | 7/2015 | Christopulos | ...... | G06K 9/00637 |
| 9,471,845 B1* | 10/2016 | Maali | ................. | G06K 9/00771 |
| 9,842,247 B2* | 12/2017 | Zhang | ............... | G06K 9/00604 |
| 10,037,456 B2* | 7/2018 | Friedland | .......... | G06K 9/00973 |
| 2006/0064248 A1* | 3/2006 | Saidi | .................... | G06K 9/0014 |
| | | | | 702/19 |
| 2009/0297007 A1* | 12/2009 | Cosatto | .............. | G06K 9/00147 |
| | | | | 382/131 |
| 2009/0304290 A1* | 12/2009 | Fukaya | .............. | G06K 9/00228 |
| | | | | 382/224 |
| 2011/0026840 A1* | 2/2011 | Tao | .................... | G06K 9/00684 |
| | | | | 382/224 |
| 2014/0072213 A1* | 3/2014 | Paiton | .................. | G06K 9/4619 |
| | | | | 382/165 |
| 2014/0172643 A1* | 6/2014 | Fazl Ersi | ............. | G06K 9/4642 |
| | | | | 705/26.64 |

(Continued)

FOREIGN PATENT DOCUMENTS

JP 5100596 B2 12/2012

OTHER PUBLICATIONS

Paul Viola, Michael Jones, Rapid Object Detection using a Boosted Cascade of Simple Features, Accepted Conference on Computer Vision and Pattern Recognition 2001, Proceedings of IEEE Conference on Computer Vision and Pattern Recognition, vol. 1, pp. 511-518 (pp. 1-9).

*Primary Examiner* — Mia M Thomas
(74) *Attorney, Agent, or Firm* — Canon U.S.A., Inc. IP Division

(57) ABSTRACT

A configuration of a pattern classification apparatus capable of implementing pattern classification is provided. The apparatus generates feature data base on an image and classifies a predetermined pattern by referring to the feature data.

18 Claims, 9 Drawing Sheets

(56) References Cited

U.S. PATENT DOCUMENTS

| | | | |
|---|---|---|---|
| 2014/0193088 A1* | 7/2014 | Capata | G06K 9/00255 382/228 |
| 2014/0355879 A1* | 12/2014 | Agosta | G06K 9/00791 382/170 |
| 2015/0310370 A1* | 10/2015 | Burry | G06K 9/00785 705/7.26 |
| 2016/0174902 A1* | 6/2016 | Georgescu | G06T 7/73 600/408 |
| 2016/0259995 A1* | 9/2016 | Ishii | G06K 9/46 |
| 2016/0321521 A1* | 11/2016 | Chen | G06K 9/6286 |
| 2017/0091593 A1* | 3/2017 | Chen | G06K 9/00362 |
| 2017/0337711 A1* | 11/2017 | Ratner | H04N 19/176 |

* cited by examiner

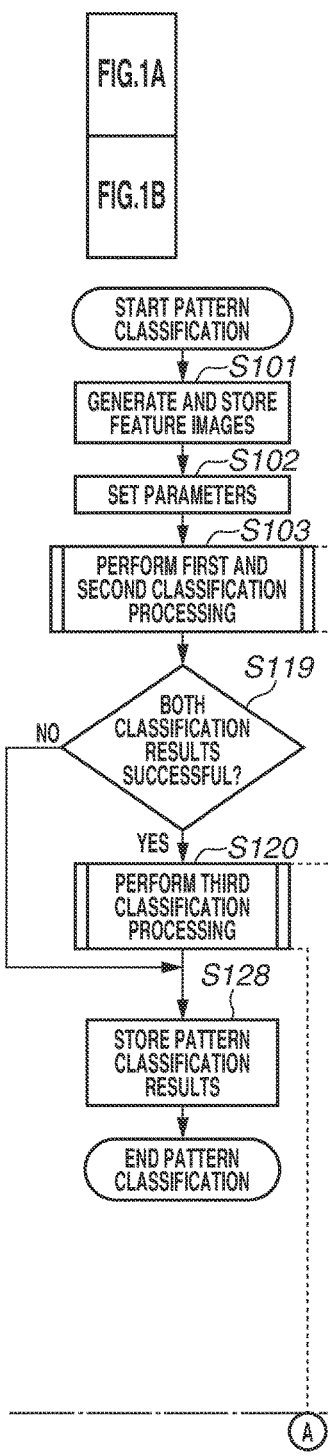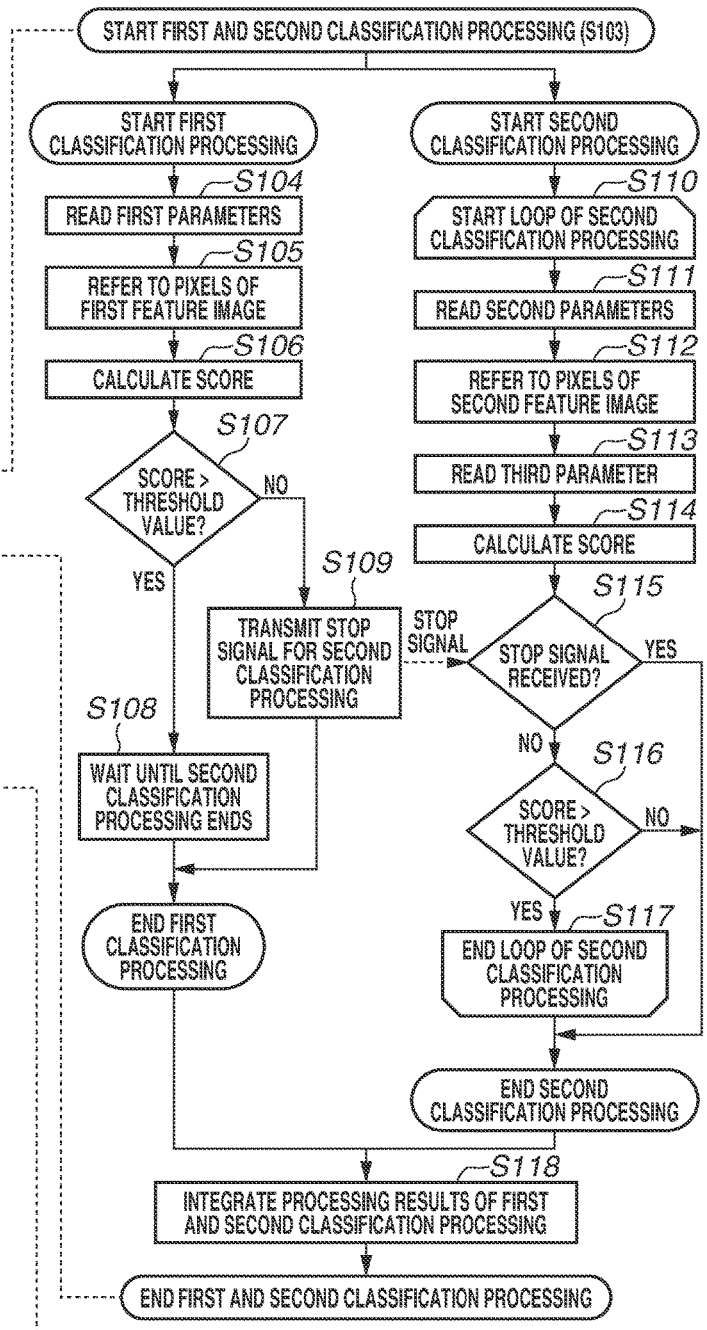

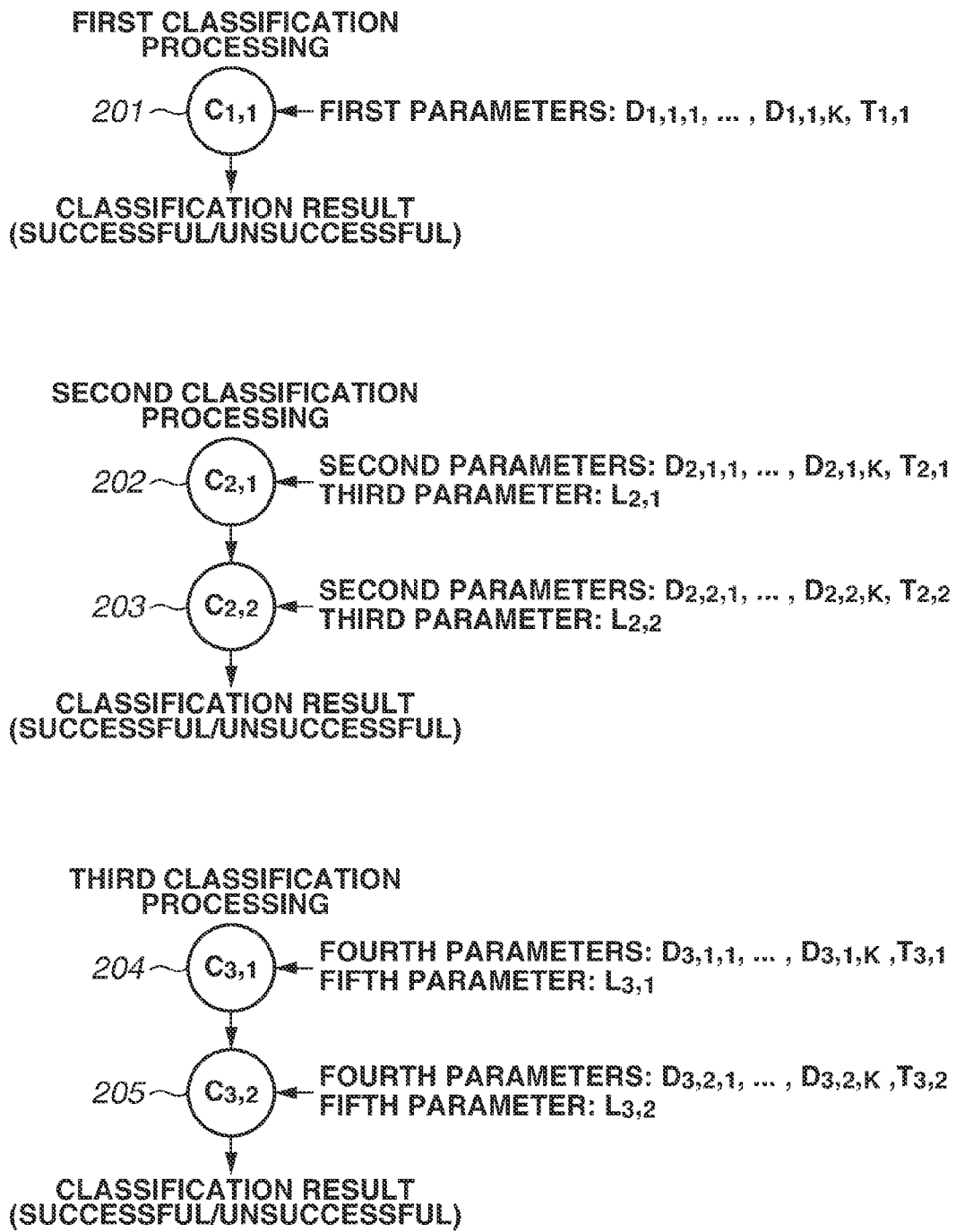

APPARATUS AND METHOD FOR CLASSIFYING PATTERN IN IMAGE

BACKGROUND OF THE INVENTION

Field of the Invention

The present invention relates to an image processing apparatus and an image processing method for classifying a pattern in an image at high speed.

Description of the Related Art

There is proposed a technique for classifying a specific pattern such as a human body and a human face in an image. In particular, pattern classification techniques for built-in systems for portable terminals and in-vehicle apparatuses have been attracting attentions in recent years.

P. Viola and M. Jones, "Rapid Object Detection using a Boosted Cascade of Simple Features", Proceedings of IEEE Conference on Computer Vision and Pattern Recognition, Vol. 1, pp. 511-518, December 2001 discusses the following algorithm for increasing the pattern detection speed. The technique generates parameters through Boosting learning and sequentially processes weak classifiers connected in cascade, by using a feature image. Based on a classification result of a weak classifier, the technique determines whether to process the next weak classifier. When the technique determines not to process the next weak classifier (abort), processing of the remaining weak classifiers is omitted.

Japanese Patent No. 5100596 discusses a technique for improving the efficiency of classification processing by using a plurality of calculation apparatuses. More specifically, the technique is intended to improve the processing efficiency by adjusting the configuration of the calculation apparatuses based on a pre-identified pass rate and a pre-identified processing time of the classification processing.

Position and orientation measurement for an imaging apparatus based on image information is used for diverse purposes such as positioning between a real space and a virtual object in mixed reality and augmented reality, self-position estimation in a robot or car, and three-dimensional modeling of an object or space.

The above-described technique discussed in U.S. Pat. No. 5,100,596 processes weak classifiers in parallel on a pipeline basis and changes the concurrency level of the calculation apparatuses to improve the processing efficiency. However, if abort processing occurs, the processing efficiency of the calculation apparatuses may decrease.

SUMMARY OF THE INVENTION

According to an aspect of the present invention, an image processing apparatus includes a generation unit configured to generate feature data based on an image, a plurality of classification units each configured to classify a predetermined pattern by referring to the feature data, and a control unit configured to control operations of the plurality of classification units, wherein the plurality of classification units includes a first classification unit and a second classification unit, processing results of which do not depend on each other, and a third classification unit, wherein the control unit operates the first and the second classification units in parallel, and wherein, in a case where at least either one of the first and the second classification units determines that a classification condition is not satisfied, the control unit stops operations of all of the plurality of classification units, and wherein, in a case where both the first and the second classification units determine that the classification condition is satisfied, the control unit operates the third classification unit by using classification results of the first and the second classification units.

Further features of the present invention will become apparent from the following description of example embodiments with reference to the attached drawings.

BRIEF DESCRIPTION OF THE DRAWINGS

FIG. 2 illustrates logical structures of first classification processing to third classification processing performed by a pattern classification apparatus according to the first example embodiment.

DESCRIPTION OF THE EMBODIMENTS

Example embodiments of the present invention will be described in detail below with reference to the accompanying drawings.

<Configuration of Classification Processing Unit>

Figure 5:
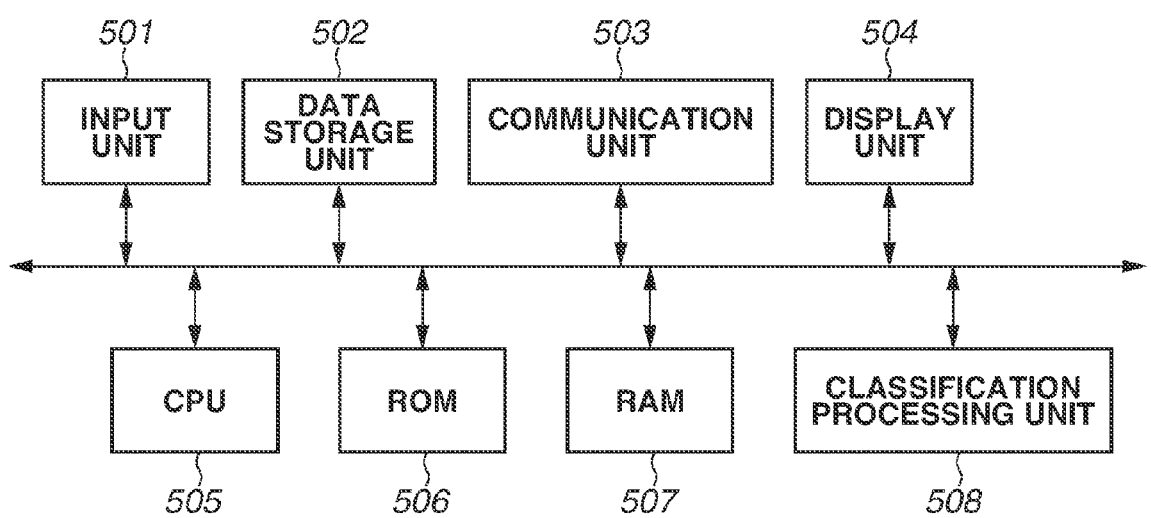
FIG. 5 is a block diagram illustrating a hardware configuration of the pattern classification apparatus according to the first example embodiment.

FIG. 5 is a block diagram illustrating an example of a configuration of a pattern classification apparatus capable of implementing pattern classification according to a first example embodiment. The pattern classification apparatus includes an input unit 501, a data storage unit 502, a communication unit 503, a display unit 504, a central processing unit (CPU) 505, a read only memory (ROM) 506, a random access memory (RAM) 507, and a classification processing unit 508. Each component will be described in detail below.

Figure 6:
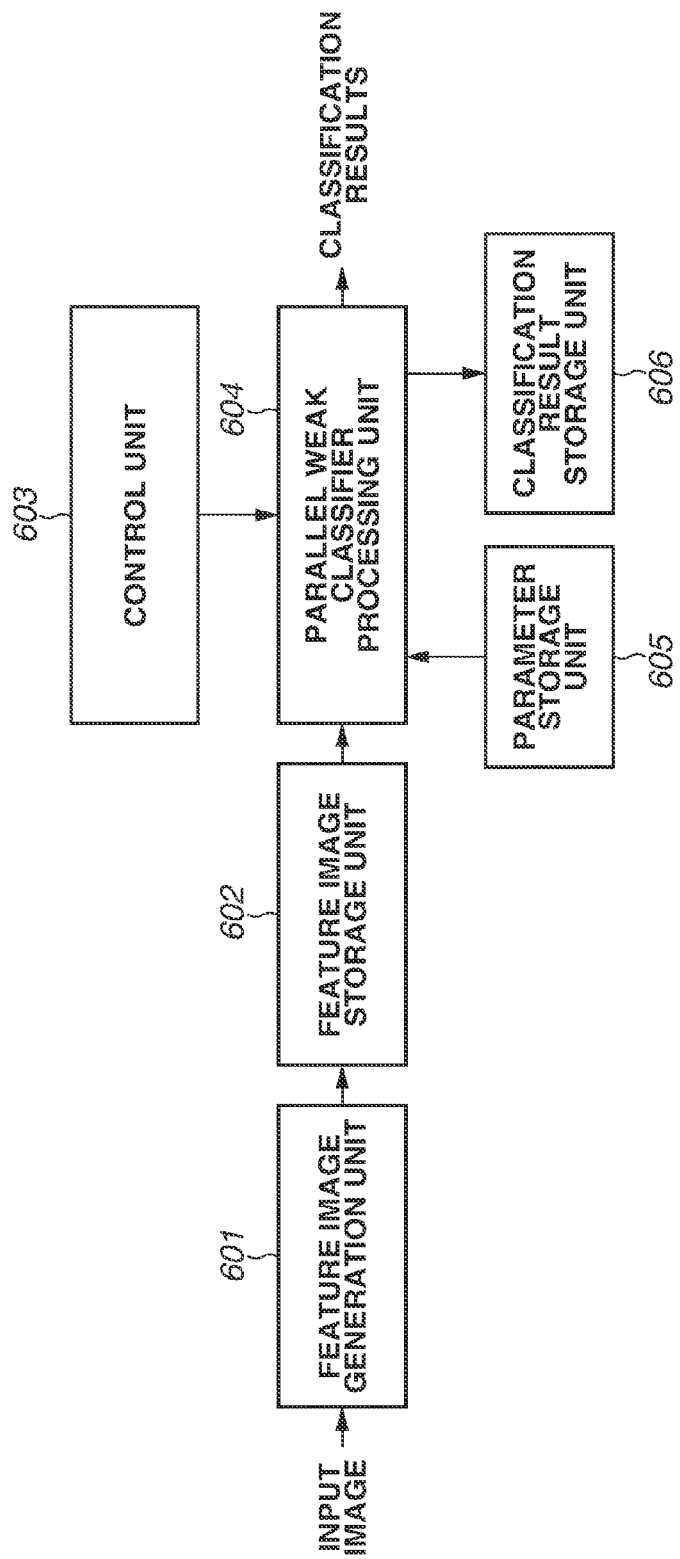
FIG. 6 is a block diagram illustrating a configuration of a classification processing unit according to the first example embodiment.

FIG. 6 is a block diagram illustrating a configuration of the classification processing unit 508 of the pattern classification apparatus. A feature image generation unit 601 applies two different types of filters to an input image to generate two feature images (feature data stream) having different characteristics. The generated feature images are stored in the feature image storage unit 602. The parallel weak classifier processing unit 604 reads the feature images stored in the feature image storage unit 602 and the parameters stored in the parameter storage unit 605, and operates a plurality of weak classifiers on a time sharing basis to perform first classification processing to third classification processing (described below). The classification result storage unit 606 stores classification results of the first classification processing to the third classification processing performed by the parallel weak classifier processing unit 604. A control unit 603 controls operations of the parallel weak classifier processing unit 604.

Figure 7:
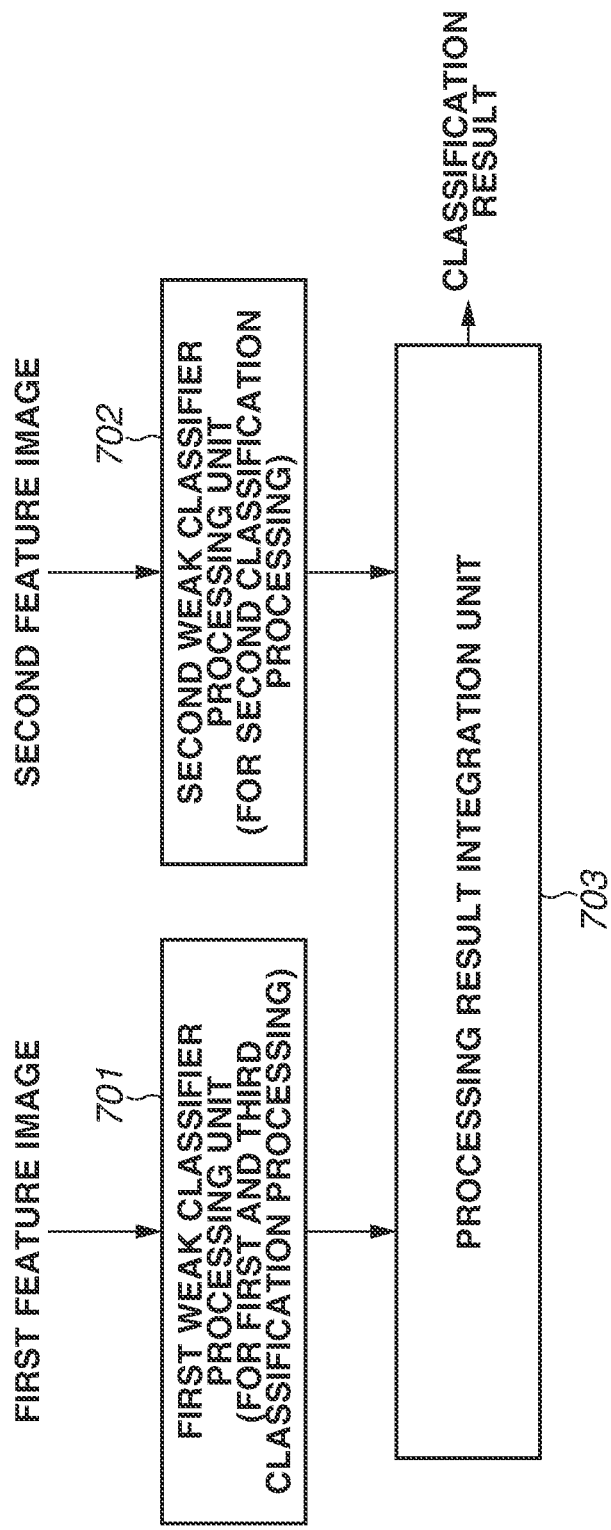
FIG. 7 is a block diagram illustrating a configuration of a parallel weak classifier processing unit according to the first example embodiment.

FIG. 7 illustrates a configuration of the parallel weak classifier processing unit 604. FIG. 2 illustrates logical structures of the first classification processing to the third classification processing performed by the pattern classification apparatus. According to an instruction of the control unit 603, a first weak classifier processing unit 701 performs the first classification processing and the third classification processing corresponding to the logical structures illustrated in FIG. 2, and calculates each classification result. According to an instruction of the control unit 603, a second weak classifier processing unit 702 accesses a first feature image and a second feature image stored in the feature image storage unit 602, performs the second classification processing corresponding to the logical structure illustrated in FIG. 2, and calculates a classification result. The first and the second feature images can be accessed at the same time, and the first weak classifier processing unit 701 and the second weak classifier processing unit 702 can operate at the same time. A processing integration unit 703 integrates the classification result of the first classification processing with the classification result of the second classification processing, and determines whether to perform the third classification processing.

<Operations Based on Logical Structures of Weak Classifiers>

Operations of the first classification processing to the third classification processing, performed by the pattern classification apparatus illustrated in FIG. 7 based on the logical structures illustrated in FIG. 2, will be described.

The first classification processing calculates a classification result based on first parameters for processing one weak classifier 201. The first parameters include information indicating pixel positions (feature data) of the first feature image and a threshold value, to be referred to when performing the first classification processing.

The weak classifier 201 performs the first classification processing based on the first parameter information stored in the parameter storage unit 605, and classifies whether a classification result is successful.

The second classification processing calculates a classification result based on second and third parameters for processing two weak classifiers 202 and 203. The second parameters include information indicating pixel positions of the second feature image and a threshold value, to be referred to when performing the second classification processing. The third parameter includes information for converting pixels when performing the second classification processing.

The weak classifiers 202 and 203 are connected in cascade and sequentially processed. The weak classifier 202 performs the second classification processing based on the second and the third parameter information stored in the parameter storage unit 605. The CPU 505 determines whether to process the weak classifier 203 according to an output result of the weak classifier 202. When the CPU 505 determines not to process the weak classifier 203, the classification result of the second classification processing is unsuccessful. When the CPU 505 determines to process the weak classifier 203, the weak classifier 203 completes the remaining second classification processing based on the second and the third parameter information stored in the parameter storage unit 605, and classifies whether a classification result is successful.

The CPU 505 determines whether to perform the third classification processing based on the classification results of the first classification processing and the second classification processing. When both the classification results of the first classification processing and the second classification processing are successful, the CPU 505 performs the third classification processing. On the other hand, when at least either one of the classification results of the first classification processing and the second classification processing is unsuccessful, the CPU 505 does not perform the third classification processing. The first classification processing and the second classification processing refer to different feature images, and the processing results do not depend on each other. Therefore, the first classification processing and the second classification processing can be performed at the same time.

The third classification processing calculates a classification result based on fourth and fifth parameters for processing two weak classifiers 204 and 205. The fourth parameters include information indicating pixel positions of the second feature image and a threshold value, to be referred to when performing the third classification processing. The fifth parameter includes information for converting pixels when performing the third classification processing.

The weak classifiers 204 and 205 are connected in cascade and sequentially processed. The weak classifier 204 performs the third classification processing based on the fourth and the fifth parameter information stored in the parameter storage unit 605. The CPU 505 determines whether to process the weak classifier 205 according to an output result of the weak classifier 204. When the CPU 505 determines not to process the weak classifier 205, the classification result of the third classification processing is unsuccessful. When the CPU 505 determines to process the weak classifier 205, the weak classifier 205 completes the remaining third classification processing based on the fourth and the fifth parameter information stored in the parameter storage unit 605, and classifies whether the classification result is successful.

When all of the classification results of the first classification processing to the third classification processing are successful, the CPU 505 classifies that a predetermined pattern exists in the input image. On the other hand, when at least either one of the classification results of the first classification processing to the third classification processing is unsuccessful, the CPU 505 classifies that the predetermined pattern does not exist in the input image.

<Pattern Classification Processing Procedure>

Figure 1B:
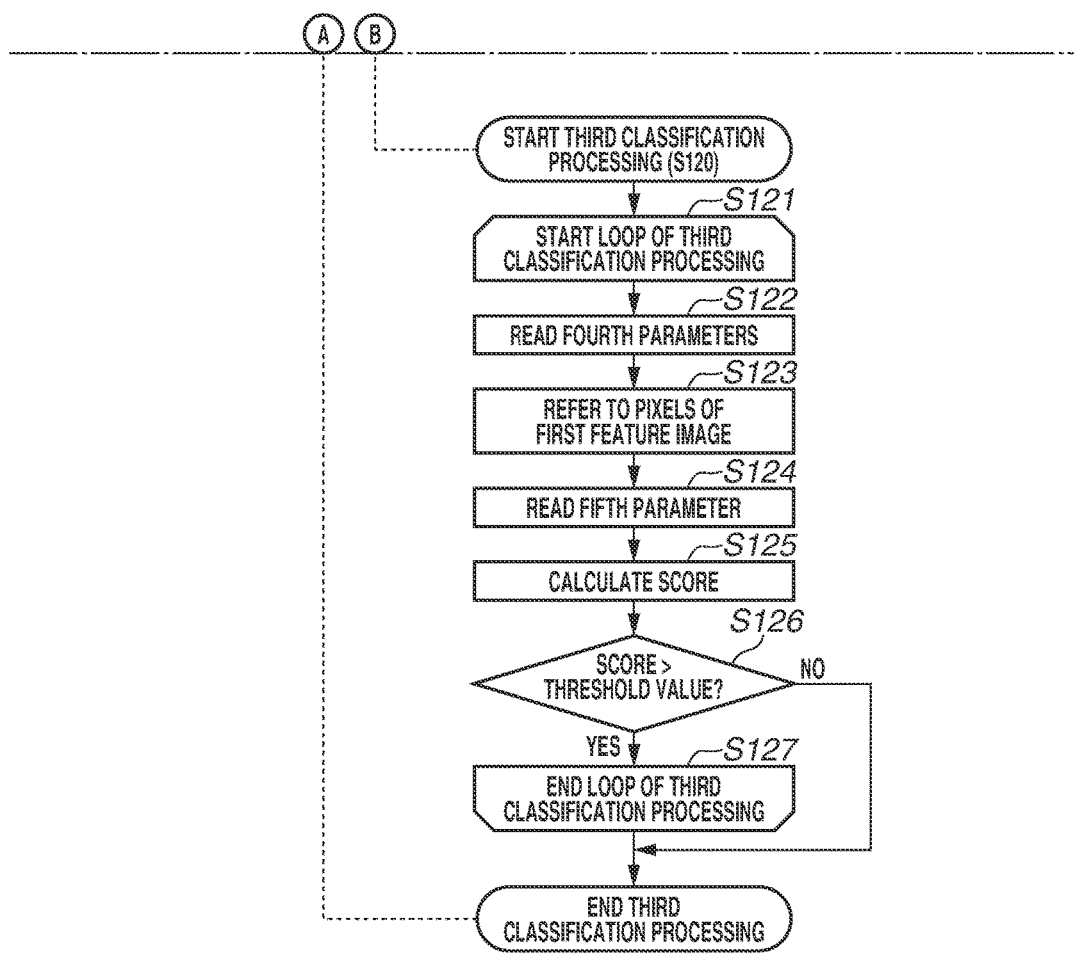
FIG. 1 (composed of FIGS. 1A and 1B and inclusively referred to as FIG. 1) is a flowchart illustrating a pattern classification processing procedure according to a first example embodiment.

FIG. 1 (composed of FIGS. 1A and 1B and inclusively referred to as FIG. 1) is a flowchart illustrating a pattern classification processing procedure according to the present example embodiment. In step S101, the CPU 505 generates two different feature images from the one input image and stores the feature images in the feature image storage unit 602.

In step S102, the CPU 505 sets the first to the fifth parameters for the first classification processing to the third classification processing. The first to the fifth parameters corresponding to each weak classifier are predetermined through a learning algorithm (such as Boosting learning).

In step S103, the CPU 505 performs the first classification processing (steps S104 to S108) and the second classification processing (steps S109 to S117) by referring to the pixels of the two feature images stored in the feature image storage unit 602. Steps S104 to S108 indicate an operation of the first weak classifier processing unit 701. Steps S109 to S117 indicate an operation of the second weak classifier processing unit 702. Step S118 indicates an operation of the processing result integration unit 702.

In step S119, the CPU 505 determines whether to perform the third classification processing based on the classification results of the first classification processing and the second classification processing. When both the processing results of the first classification processing and the second classification processing are successful (YES in step S119), the processing proceeds to step S120. On the other hand, when at least either one of the classification results of the first classification processing and the second classification processing is unsuccessful (NO in step S119), the processing proceeds to step S128.

In step S120, the CPU 505 performs the third classification processing (steps S121 to S127) by referring to the pixels of the feature images stored in the feature image storage unit 602. Steps S121 to S127 indicate operations of the first weak classifier processing unit 701.

In step S128, the CPU 505 determines whether a predetermined pattern exists in the input image based on the classification results of the first classification processing to the third classification processing, and stores a pattern classification result in the result storage unit 606. The control unit 603 controls steps S103, S119, and S120.

<First Classification Processing>

In step S104, the CPU 505 reads first parameters ($D_{1,1,j}$, $T_{1,1}$) corresponding to the weak classifier 201 for the first classification processing. The first parameter $D_{1,1,j}$ is a coordinate value in the first feature image, and the first parameter $T_{1,1}$ is a threshold value. The j-th parameter $D_{1,1,j}$ (j=1 to K, where K is the number of data items on the feature image referred to by the weak classifier 201) is represented by formula (1), where $X_{1,1,j}$ denotes the X coordinate value and $Y_{1,1,j}$ denotes the Y coordinate value.

$$D_{1,1,j}=(X_{1,1,j}, Y_{1,1,j}) \quad (1)$$

In step S105, the CPU 505 reads K feature data f1 ($X_{1,1,j}$, $Y_{1,1,j}$) corresponding to coordinates ($X_{1,1,j}$, $Y_{1,1,j}$).

In step S106, the CPU 505 calculates a score $S_{1,1}$ of the weak classifier 201. The description is given of a simple example of a case where the CPU 505 refers to two points (K=2) of the feature image (j=1, 2), and adds the values to obtain the score $S_{1,1}$, as represented by formula (2). The score $S_{1,1}$ is not limited to the total value. The feature data may be converted into the score $S_{1,1}$ by using an arbitrary feature data conversion function.

$$S_{1,1}=f(X_{1,1,1}, Y_{1,1,1})+f(X_{1,1,2}, Y_{1,1,2}) \quad (2)$$

In step S107, the CPU 505 compares the score $S_{1,1}$ with the threshold value $T_{1,1}$ read in step S104. When the score $S_{1,1}$ does not exceed the threshold value $T_{1,1}$ (NO in step S107), the classification condition is not satisfied and the classification result is unsuccessful. Then, the processing proceeds to step S109. In step S109, the CPU 505 transmits a stop signal for the second classification processing to forcibly end the second classification processing. Then, the processing proceeds to step S118. On the other hand, when the score $S_{1,1}$ exceeds the threshold value $T_{1,1}$ (YES in step S107), the classification condition is satisfied and the classification result is successful. Then, the processing proceeds to step S108. In step S108, the CPU 505 waits until the second classification processing ends.

<Second Classification Processing>

In step S110, the CPU 505 starts the loop of the second classification processing.

In step S111, the CPU 505 reads second parameters ($D_{2,i,j}$, $T_{2,i}$) corresponding to the i-th weak classifier (i=1 to M, where M denotes the number of weak classifiers) for the second classification processing. In the present example embodiment, the following describes a simple example of a case where the second classification processing is performed by two weak classifiers 202 and 203 (M=2). The second parameter $D_{2,i,j}$ is a coordinate value in the second feature image, and differs for each weak classifier. The second parameter $T_{2,1}$ is a threshold value. The j-th parameter $D_{2,i,j}$ (j=1 to K, where K is the number of data items on the feature image referred to by each weak classifier) is represented by formula (3), where $X_{2,i,j}$ denotes the X coordinate value and $Y_{2,i,j}$ denotes the Y coordinate value.

$$D_{2,i,j}=(X_{2,i,j}, Y_{2,i,j}) \quad (3)$$

In step S112, the CPU 505 reads K feature data f2($X_{2,i,j}$, $Y_{2,i,j}$) corresponding to coordinates ($X_{2,i,j}$, $Y_{2,i,j}$).

In step S113, the CPU 505 reads a third parameter $L_{2,i}$ corresponding to the i-th weak classifier. The third parameter is information indicating a feature data conversion function. The feature data conversion function corresponding to the i-th weak classifier is $L_{2,i}(\bullet)$ that converts the feature data read in step S112 into a score equivalent to a target pattern likelihood.

In step S114, the CPU 505 calculates a score $S_{2,i}$ of the i-th weak classifier by using the feature data conversion function. The description is given of a simple example of a case where the CPU 505 refers to two points (K=2) of the second feature image (j=1, 2) and sets the values as feature data for weak classification. Since the processing result of the first classification processing is not used for the calculation of the score $S_{2,i}$, the second classification processing does not depend on the processing result of the first classification processing. The score $S_{2,i}$ is represented by formula (4).

$$S_{2,i}=L_{2,i}(f(X_{2,i,1}, Y_{2,i,1}), f(X_{2,i,2}, Y_{2,i,2})) \quad (4)$$

In step S115, the CPU 505 determines whether the stop signal is received from the first classification processing. When the stop signal is received (YES is step S115), the CPU 505 ends the second classification processing. Then, the processing proceeds to step S118. On the other hand, when the stop signal is not received (NO in step S115), the processing proceeds to step S116.

In step S116, the CPU 505 compares the score $S_{2,i}$ with the threshold value $T_{2,i}$ read in step S111. When the score $S_{2,i}$ does not exceed the threshold value $T_{2,i}$ (NO in step S116), the CPU 505 determines that the feature data will not pass through the weak classifier and ends the second classification processing. Then, the processing proceeds to step S118. On the other hand, when the score $S_{2,i}$ exceeds the threshold value $T_{2,i}$ (YES in step S116), the CPU 505 determines that the feature data will pass through the weak classifier. Then, the processing proceeds to step S117. In the second classification processing, when the feature data has passed through up to the last weak classifier 203, the classification result of the second classification processing is successful.

In step S117, the CPU 505 determines to end the loop of the second classification processing. According to the present example embodiment, since the first classification processing is faster than the second classification processing, the first classification processing has already been completed when the second classification processing ends.

In step S118, the CPU 505 integrates the processing result of the first classification processing with the processing result of the second classification processing, and stores the score and the classification result. Upon completion of the integration, the processing proceeds to step S119.

<Third Classification Processing>

In step S121, the CPU 505 starts the loop of the third classification processing.

In step S122, the CPU 505 reads fourth parameters ($D_{3,i,j}$, $T_{3,i}$) corresponding to the i-th weak classifier (i=1 to M, where M is the number of weak classifiers) for the third classification processing. In the present example embodiment, the description is given of a simple example of a case where the second classification processing is performed by two weak classifiers 202 and 203 (M=2). The fourth parameter $D_{3,i,j}$ is a coordinate value in the first feature image, and differs for each weak classifier. In the first classification processing and the third classification processing, since pixels are referred to from the same feature image (first feature image) and a memory is commonly used, so that memory cost can be reduced. Since the CPU 505 sequentially performs the first classification processing and the third classification processing, a conflict due to memory access does not occur. The fourth parameter $T_{3,i}$ is a threshold value. The j-th parameter $D_{3,i,j}$ (j=1 to K, where K is the number of data items on the feature image referred to by a weak classifier) is represented by formula (5), where is the X coordinate value and $Y_{3,i,j}$ is the Y coordinate value.)

$$D_{3,i,j}=(X_{3,i,j},\ Y_{3,i,j}) \quad (5)$$

In step S123, the CPU 505 reads K feature data f1($X_{3,i,j}$, $Y_{3,i,j}$) corresponding to coordinates ($X_{3,i,j}$, $Y_{3,i,j}$).

In step S124, the CPU 505 reads a fifth parameter ($L_{3,i}$) corresponding to the i-th weak classifier. The fifth parameter is information indicating a feature data conversion function. The feature data conversion function corresponding to the i-th weak classifier is $L_{3,i}(\bullet)$ that converts the feature data read in step S123 into a score equivalent to a target pattern likelihood.

In step S125, the CPU 505 calculates a score $S_{3,i}$ of the i-th weak classifier by using the feature data conversion function and an offset S0 based on formula (6). The description is given of a simple example of a case where the CPU 505 refers to two points (K=2) of the first feature image (j=1, 2) and sets the values as feature data for weak classification. When the classification results of the first classification processing and the second classification processing are used, the classification processing offset S0 is the score stored in step S118, and the third classification processing depends on the processing results of the first classification processing and the second classification processing. When the classification results of the first classification processing and the second classification processing are not used, the offset S0 is a constant, and the third classification processing does not depend on the processing results of the first classification processing and the second classification processing.

$$S_{3,i}=L_{3,i}(f(X_{3,i,1},\ Y_{3,i,1}),f(X_{3,i,2},\ Y_{3,i,2}))+S_0 \quad (6)$$

In step S126, the CPU 505 compares the score $S_{3,i}$ with the threshold value $T_{3,i}$ read in step S122. When the score $S_{3,i}$ does not exceed the threshold value $T_{3,i}$ (NO in step S126), the CPU 505 determines that the feature data will not pass through the weak classifier and ends the third classification processing. Then, the processing proceeds to step S128. On the other hand, when the score $S_{3,i}$ exceeds the threshold value $T_{3,i}$ (YES in step S126), the CPU 505 determines that the feature data will pass through the weak classifier. Then, the processing proceeds to step S127. In the third classification processing, when the feature data has passed through up to the last weak classifier 205, the classification result of the third classification processing is successful. The CPU 505 determines that the predetermined pattern exists in the input image.

In step S127, the CPU 505 determines to end the loop of the third classification processing.

<Descriptions of Processing Time in First and Second Classification Processing>

Figure 3:
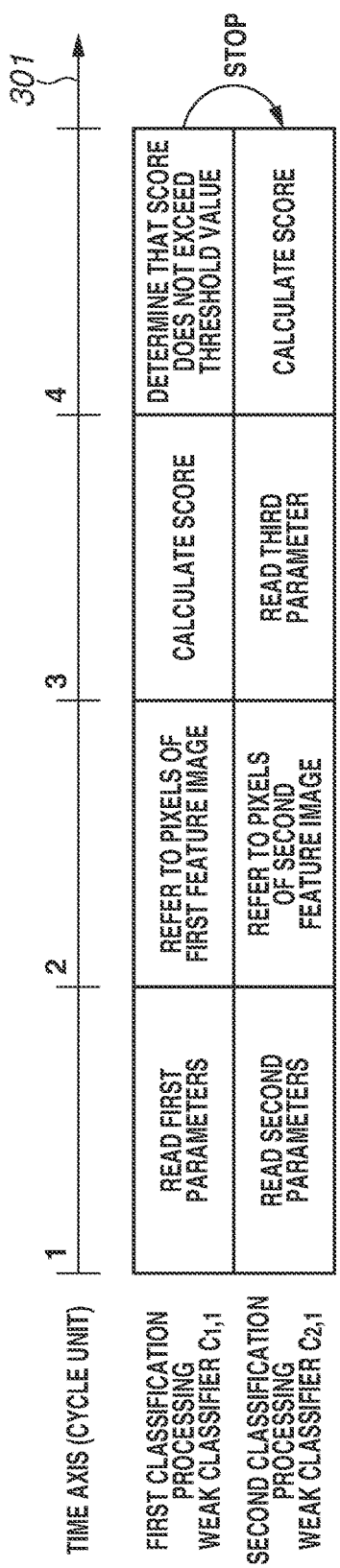
FIG. 3 illustrates examples of the first classification processing and the second classification processing performed by the pattern classification apparatus according to the first example embodiment.

FIG. 3 illustrates an example of a case where the classification result of the first classification processing is unsuccessful and a predetermined pattern does not exist in the input image. A time axis 301 indicates the processing cycle.

In cycle 1, the CPU 505 simultaneously starts the first classification processing and the second classification processing and reads the first parameters ($D_{1,1,j}$ and $T_{1,1}$) and the second parameters ($D_{2,1,j}$ and $T_{2,1}$). In cycle 2, to perform the first classification processing, the CPU 505 refers to the pixels of the first feature image corresponding to the first parameters. To process the weak classifier 201 in the second classification processing, the CPU 505 refers to the pixels of the second feature image corresponding to the second parameters. In cycle 3, the CPU 505 calculates the score $S_{1,1}$ by using the pixels of the first feature image based on formula (2). At the same time, the CPU 505 reads the third parameter ($L_{2,1}$). In cycle 4, the CPU 505 compares the score $S_{1,1}$ calculated in cycle 3 with the threshold value $T_{1,1}$ read in cycle 1. At the same time, the CPU 505 calculates the score $S_{2,1}$ by using the pixels of the second feature image and the third parameter based on formula (4). Since the CPU 505 determines that the score $S_{1,1}$ calculated in cycle 3 does not exceed the threshold value $T_{1,1}$, the classification result of the first classification processing is unsuccessful. Then, the CPU 505 stops the first classification processing and the second classification processing. Thus, the first classification processing and the second classification processing can be completed in the time period of 4 cycles.

The lower the probability that the classification result of the first classification processing is successful, the hither the possibility that all of the classification processing is completed in the time period of 4 cycles.

Figure 4:
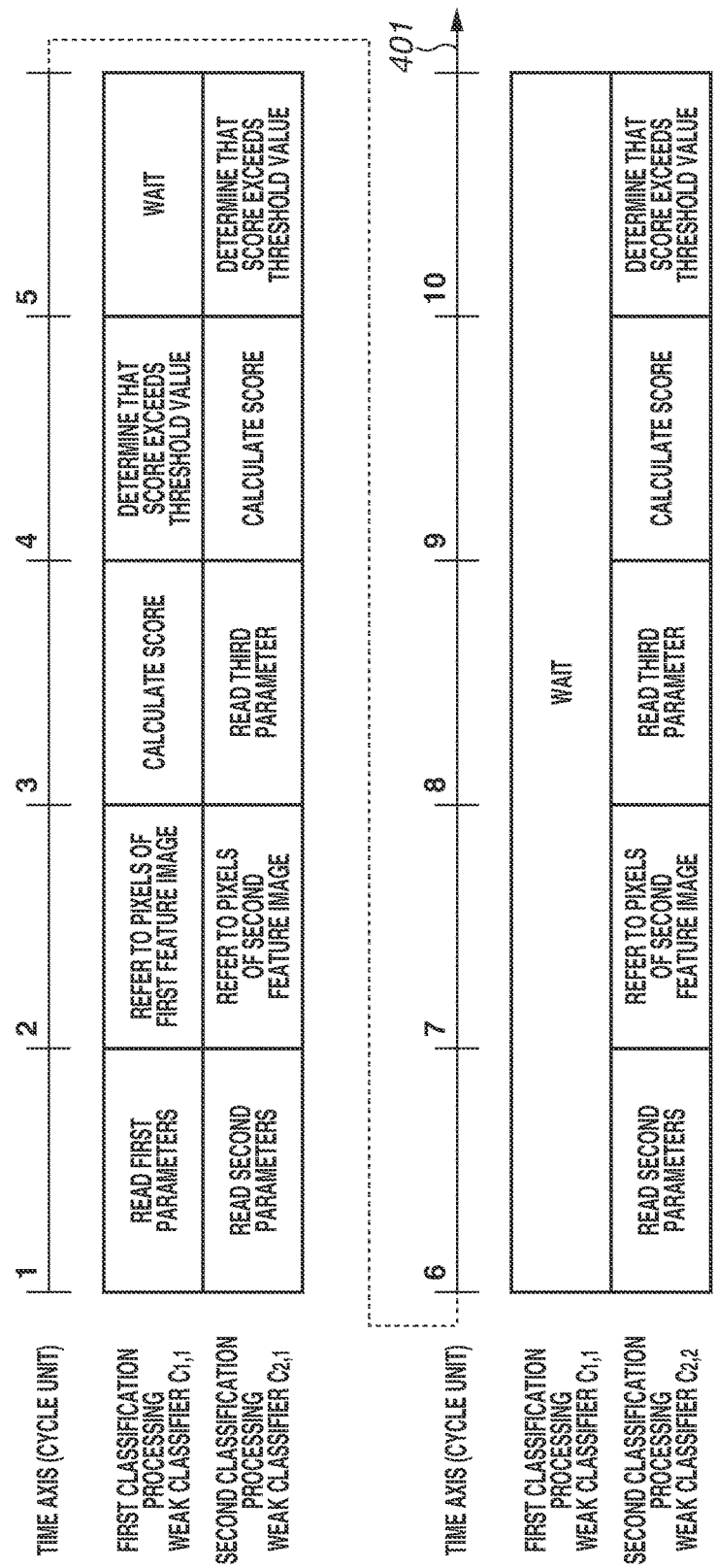
FIG. 4 illustrates examples of the first classification processing and the second classification processing performed by the pattern classification apparatus according to the first example embodiment.

FIG. 4 illustrates an example where both the classification results of the first classification processing and the second classification processing are successful. A time axis 401 indicates the processing cycle.

Processing in cycles 1 to 3 is the same as that illustrated in FIG. 3. In cycle 4, the CPU 505 compares the score $S_{1,1}$ calculated in cycle 3 with the threshold value $T_{1,1}$ read in cycle 1. At the same time, the CPU 505 calculates the score $S_{2,1}$ by using the pixels of the second feature image and the third parameter based on formula (4). Since the CPU 505 determines that the score $S_{1,1}$ calculated in cycle 3 exceeds the threshold value $T_{1,1}$, the classification result of the first classification processing is successful. Then, the CPU 505 does not stop the first or the second classification processing. In cycle 5, the CPU 505 compares the score $S_{2,1}$ calculated in cycle 4 with the threshold value $T_{2,1}$ read in cycle 1. Since the CPU 505 determines that the score $S_{2,1}$ exceeds the threshold value $T_{2,1}$, the CPU 505 processes the weak classifier 202 for the second classification processing.

In cycle 6, the first classification processing is in the wait state. The CPU 505 continues the second classification processing and reads the second parameters ($D_{2,2,j}$ and $T_{2,2}$). In cycle 7, to process the weak classifier 203 for the second classification processing, the CPU 505 refers to the pixels of the second feature image corresponding to the second parameters. In cycle 8, the CPU 505 reads the third parameter ($L_{2,2}$). In cycle 9, the CPU 505 calculates the score $S_{2,2}$ by using the pixels of the second feature image based on formula (4). In cycle 10, the CPU 505 compares the score $S_{2,2}$ calculated in cycle 9 with the threshold value $T_{2,2}$ read in cycle 6. Since the CPU 505 determines that the score $S_{2,2}$ exceeds the threshold value $T_{2,2}$, the classification result of the second classification processing is successful. Thus, the first classification processing and the second classification processing can be completed in the time period of 10 cycles. From cycle 11 on, the CPU 505 performs the third classification processing.

According to the present example embodiment, the CPU 505 shortens the processing time by simultaneously performing the first classification processing and the second classification processing. Since the CPU 505 stops the second classification processing when the first classification processing stops, the CPU 505 can immediately start the classification processing with the next input image, improving the use efficiency of calculation apparatuses. Since the first feature image for the first classification processing and the third classification processing is stored in a common memory, memory cost can be reduced.

<Example of Configuration of Pattern Classification Apparatus>

FIG. 5 is a block diagram illustrating an example of a configuration of the pattern classification apparatus capable of implementing pattern classification according to the present example embodiment.

A data storage unit 502 is a portion for storing image data. Generally, the data storage unit 502 is, for example, a hard disk, a flexible disk, a compact disc read only memory (CD-ROM), a compact disc recordable (CD-R), a digital versatile disc (DVD), a memory card, a compact flash (CF) card, SmartMedia, a secure digital (SD) card, a memory stick, an xD image card, and a universal serial bus (USB) memory. In addition to image data, programs and other data can be stored in the data storage unit 502. Alternatively, a part of the RAM 507 (described below) may be used as the data storage unit 502. Alternatively, a storage device of the above-mentioned apparatuses connected via the communication unit 503 (described below) may be virtually used as the data storage unit 502 via the communication unit 503.

The display unit 504 is a device for displaying images before and after image processing and an image of a graphical user interface (GUI). Generally, a cathode ray tube (CRT) or a liquid crystal display (LCD) is used. Alternatively, the display unit 504 may be an external display device connected via a cable.

The input unit 501 is an apparatus for inputting an instruction and data from a user, such as a keyboard, a pointing device, and buttons.

Alternatively, the display unit 504 and the input unit 501 may be an identical device such as a known touch screen device. In this case, an input on the touch screen is handled as an input from the input unit 501.

The CPU 505 and the classification processing unit 508 perform main processing (steps S101 to S127) according to the present example embodiment and, at the same time, controls operations of the entire apparatus. The ROM 506 and the RAM 507 provide the CPU 505 with programs, data, and works areas used for the processing of the CPU 505. A program for processing (described below) stored in the data storage unit 502 or the ROM 506 is once loaded into the RAM 507 and then executed. When the image processing apparatus receives a program via the communication unit 503, the program is once stored in the data storage unit 502 and then loaded into the RAM 507 or directly loaded into the RAM 507 from the communication unit 503, and then executed.

When the CPU 505 transmits an instruction to the classification processing unit 508, the classification processing unit 508 reads the image data loaded into the RAM 507, performs pattern classification according to the present example embodiment, and stores the classification result in the RAM 507 again. Based on the pattern classification result, the CPU 505 performs image processing or image recognition. The result of image recognition performed by the CPU 505 is stored in the RAM 507 or transmitted to an external apparatus via the communication unit 503.

Although the configuration illustrated in FIG. 5 includes only one CPU 505, a plurality of CPUs may be included. FIGS. 6 illustrates a configuration of the classification processing unit 508. FIG. 7 illustrates a configuration of the parallel weak classifier processing unit 604 in the classification processing unit 508. The feature image generation unit 601, the control unit 603, and the parallel weak classifier processing unit 604 operate based on an instruction of the CPU 505.

The communication unit 503 is an interface (I/F) for performing communication between apparatuses. Although in FIG. 5, the input unit 501, the data storage unit 502, and the display unit 504 as included in one apparatus, these units may be connected with a communication path based on a known communication method to implement the configuration illustrated in FIG. 5.

Although a system configuration of various example embodiments of the apparatus may also include components in addition to the above-described ones, such components are not a main object of the present invention and descriptions thereof will be omitted.

Although, in the first example embodiment, pattern classification is performed on an input image and a feature image (two-dimensional data and a two-dimensional array), the processing target is not limited thereto. Pattern classification may be performed on an input data stream having an arbitrary dimension and a feature data stream having an arbitrary dimension.

Figure 8:
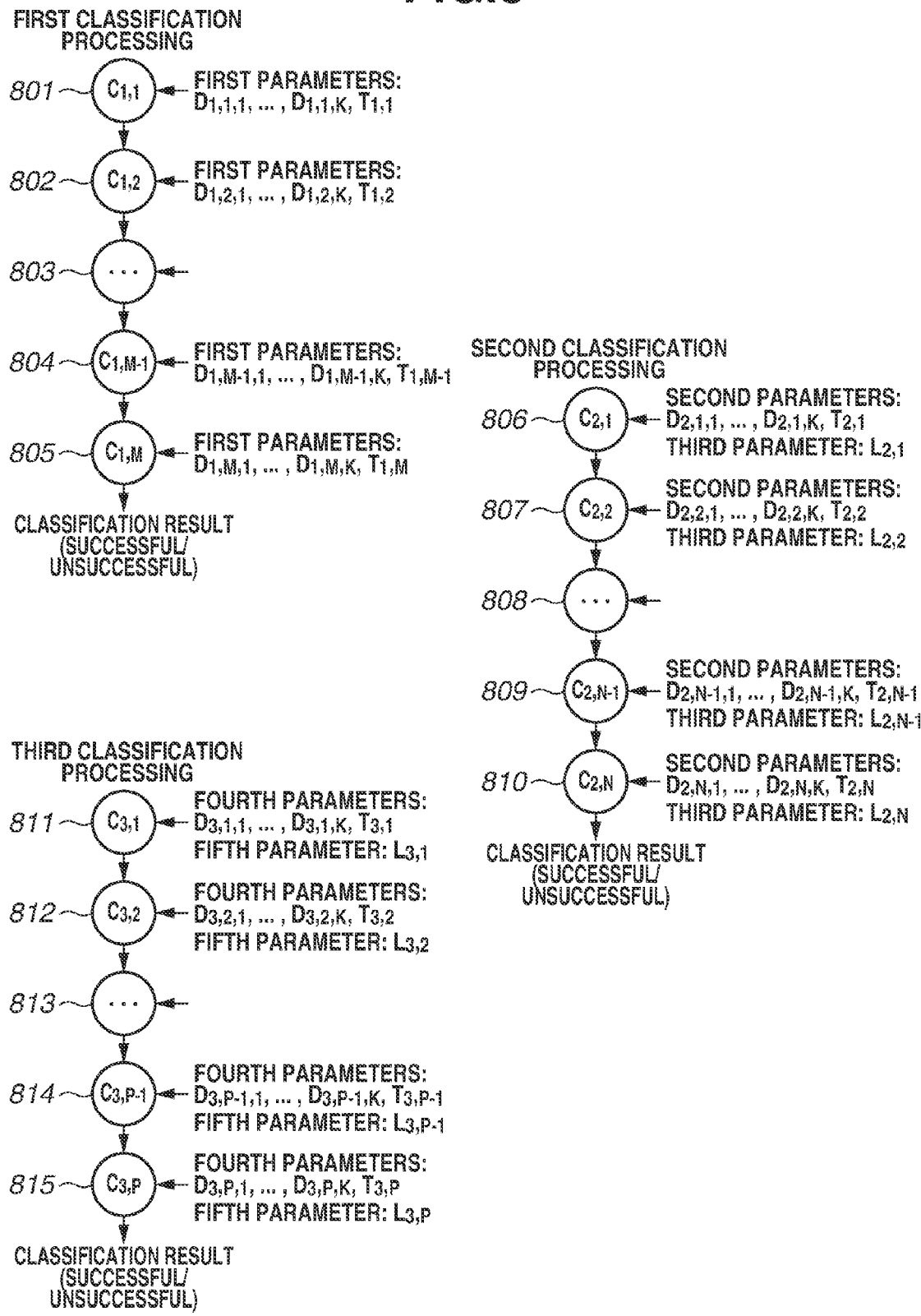
FIG. 8 illustrates logical structures of first classification processing to third classification processing performed by a pattern classification apparatus according to another example embodiment.

Although, in the first example embodiment, one weak classifier is used in the first classification processing, the number of weak classifiers is not limited thereto. An arbitrary number of weak classifiers may be used on the premise that the processing time of the first classification processing is shorter than the processing time of the second classification processing. FIG. 8 illustrates a logical structure of the classification processing in which M weak classifiers 801 to 805 are connected in cascade.

Although, in the first example embodiment, two weak classifiers are connected in cascade in the second classification processing, the number of weak classifiers is not limited thereto. An arbitrary number of weak classifiers may be connected. FIG. 8 illustrates a logical structure of the classification processing in which N weak classifiers 806 to 810 are connected in cascade.

Although, in the first example embodiment, two weak classifiers are connected in cascade in the third classification processing, the number of weak classifiers is not limited thereto. An arbitrary number of weak classifiers may be connected. FIG. 8 illustrates a logical structure of the classification processing in which P weak classifiers 811 to 815 are connected in cascade.

In the first example embodiment, the second classification processing is forcibly ended based on the classification result of the first classification processing. However, the first classification processing and the second classification processing may be forcibly ended based on the classification result of the classification processing having the shortest processing time out of the first classification processing and the second classification processing.

Although, in the first example embodiment, two different types of classification processing (the first classification processing and the second classification processing) are started at the same time, the number of types of classification processing is not limited thereto, and may be three or more.

Although, in the first example embodiment, two different feature images are generated by using one input image, the number of input images is not limited thereto. A plurality of images or moving images may be used.

Although, in the first example embodiment, two different feature images are generated by using one input image, the number of feature images is not limited thereto, and may be three (first to third feature images) or more. Although the first feature image is referred to in the third classification processing, the reference target image is not limited to the first feature image, and may be the second or the third feature image.

Although, in the first example embodiment, the first parameters $X_{1,i,j}$ and $Y_{1,i,j}$ represented by formula (1) are described, the first parameters are not limited to the coordinates of one image, and may be the coordinates of a plurality of images or a plurality of sets of coordinates in the time-sequential space at the time of moving image processing.

Although, in the first example embodiment, the second parameters $X_{2,i,j}$ and $Y_{2,i,j}$ represented by formula (3) are described, the second parameters are not limited to the coordinates of one image, and may be the coordinates of a plurality of images or a plurality of sets of coordinates in the time-sequential space at the time of moving image processing. This also applies to the fourth parameters.

Although, in the first example embodiment, the scores ($S_{1,1}$ and $S_{2,i}$) are calculated by using two sets of coordinates and a feature data conversion function, the calculation method is not limited to two sets of coordinates. A plurality of sets of coordinates and a feature data conversion function may be used to calculate the scores.

Although, in the first example embodiment, two different types of filters are applied to an input image to generate two different feature images, the number of filters and the number of feature images are not thereto. An arbitrary number of feature images may be generated by using an arbitrary number of filters.

Although, in the first example embodiment, two different types of filters are applied to an input image to generate two different feature images, the generation method is not limited to filters. Arbitrary linear conversion or nonlinear conversion may be applied. When an input image is a color image, each color plane or the result of color conversion may be used as a feature image. Further, an integral image may be used as a feature image.

Although, in the first example embodiment, classification processing is performed by the classification processing unit 508, the classification processing unit 508 may be replaced with a multithread CPU (or a plurality of CPUs) capable of simultaneously performing a plurality of classification processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-082329, filed Apr. 15, 2016, which is hereby incorporated by reference herein in its entirety.

What is claimed is:

1. An image processing apparatus comprising:
at least one processor; and
a memory coupled to the at least one processor, the memory having instructions that, when executed by the processor, perform operations as:
a generation unit configured to generate feature data based on an image;
a plurality of classification units each configured to classify a predetermined pattern by referring to the feature data; and
a control unit configured to control operations of the plurality of classification units,
wherein the plurality of classification units includes a first classification unit and a second classification unit, processing results of which do not depend on each other, and a third classification unit,
wherein the control unit operates the first and the second classification units in parallel,
wherein, in a case where at least either one of the first and the second classification units determines that a classification condition is not satisfied, the control unit stops operations of all of the plurality of classification units,
wherein, in a case where both the first and the second classification units determine that the classification condition is satisfied, the control unit operates the third classification unit by using classification results of the first and the second classification units,
wherein the third classification unit refers to feature data common to the first or the second classification unit from the same memory, and wherein the control unit sequentially operates a plurality of the classification units that refer to the common feature data.

2. The image processing apparatus according to claim 1, wherein either one of the first and the second classification units has a shorter processing time than at least one other classification unit in the plurality of classification units.

3. The image processing apparatus according to claim 1, wherein, based on processing times of the plurality of classification units, the control unit determines an order of operating the plurality of classification units.

4. The image processing apparatus according to claim 1, wherein the control unit determines an order of operating the classification units based on a probability that each of the plurality of classification units has satisfied the classification condition in advance.

5. The image processing apparatus according to claim 1, wherein the feature data generated by the generation unit includes a plurality of feature data stream portions having different characteristics.

6. The image processing apparatus according to claim 5, wherein the generation unit applies different types of filters to an image to generate the plurality of feature data having different characteristics.

7. The image processing apparatus according to claim 1, wherein, in a case where the control unit determines that at least either one of the first and the second classification units does not satisfy the classification condition for a certain image, the control unit stops operations of all of the plurality of classification units and starts operations of the first and the second classification units for a next input image.

8. The image processing apparatus according to claim 1, wherein each of the determination units calculates a score based on the feature data, and compares the score with a threshold value to determine whether the classification condition is satisfied.

9. The image processing apparatus according to claim 1, wherein the feature data is a feature image, and
wherein each of the classification units calculates a score based on data of a plurality of points of the feature image.

10. The image processing apparatus according to claim 9, wherein each of the classification units calculates the score based on a total of the data of the plurality of points of the feature image.

11. An image processing method comprising:
generating feature data based on an image; and
classifying a predetermined pattern via a plurality of classification units by referring to the feature data,
wherein the plurality of classification units includes a first classification unit and a second classification unit, processing results of which do not depend on each other, and a third classification unit,
wherein, in classification by the plurality of classification units, the first and the second classification units are operated in parallel,
wherein, in a case where at least either one of the first and the second classification units determines that a classification condition is not satisfied, operations of all of the plurality of classification units are stopped, and
wherein, in a case where both the first and the second classification units determine that the classification condition is satisfied, the third classification unit is operated by using classification results of the first and the second classification units, wherein the third classification unit refers to feature data common to the first or the second classification unit from the same memory, and
wherein a plurality of the classification units that refer to the common feature data are sequentially operated.

12. The method according to claim 11, wherein either one of the first and the second classification units has a shorter processing time than at least one other classification unit in the plurality of classification units.

13. The method according to claim 11, wherein the feature data includes a plurality of feature data stream portions having different characteristics.

14. The method according to claim 11,
wherein the feature data is a feature image, and
wherein each of the classification units calculates a score based on data of a plurality of points of the feature image.

15. A non-transitory computer-readable storage medium storing a program that when executed by a computer causes the computer to function as:
a generation unit configured to generate feature data based on an image;
a plurality of classification units each configured to classify a predetermined pattern by referring to the feature data; and
a control unit configured to control operations of the plurality of classification units,
wherein the plurality of classification units includes a first classification unit and a second classification unit, processing results of which do not depend on each other, and a third classification unit,
wherein the control unit operates the first and the second classification units in parallel,
wherein, in a case where at least either one of the first and the second classification units determines that a classification condition is not satisfied, the control unit stops operations of all of the plurality of classification units,
wherein, in a case where both the first and the second classification units determine that the classification condition is satisfied, the control unit operates the third classification unit by using classification results of the first and the second classification units,
wherein the third classification unit refers to feature data common to the first or the second classification unit from the same memory, and
wherein the control unit sequentially operates a plurality of the classification units that refer to the common feature data.

16. The non-transitory computer-readable storage medium according to claim 15, wherein either one of the first and the second classification units has a shorter processing time than at least one other classification unit in the plurality of classification units.

17. The non-transitory computer-readable storage medium according to claim 15, wherein the feature data includes a plurality of feature data stream portions having different characteristics.

18. The non-transitory computer-readable storage medium according to claim 15,
wherein the feature data is a feature image, and
wherein each of the classification units calculates a score based on data of a plurality of points of the feature image.

* * * * *